US009612784B2

United States Patent
Sugiyama et al.

(10) Patent No.: US 9,612,784 B2
(45) Date of Patent: Apr. 4, 2017

(54) IMAGE PROCESSING APPARATUS, CONTROLLING METHOD THEREOF, AND COMPUTER-READABLE MEDIA FOR IMAGE PROCESSING AND AUTHENTICATION THEREOF USING AN INTERNAL OR EXTERNAL RECEIVING DEVICE

(71) Applicant: BROTHER KOGYO KABUSHIKI KAISHA, Nagoya-shi, Aichi-ken (JP)

(72) Inventors: Takashi Sugiyama, Okazaki (JP); Toyoshi Adachi, Kakamihara (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/580,428

(22) Filed: Dec. 23, 2014

(65) Prior Publication Data
US 2015/0186083 A1    Jul. 2, 2015

(30) Foreign Application Priority Data

Dec. 26, 2013 (JP) ................................ 2013-268976

(51) Int. Cl.
G06K 15/00 (2006.01)
G06F 3/12 (2006.01)
H04N 1/44 (2006.01)

(52) U.S. Cl.
CPC .......... G06F 3/1238 (2013.01); G06F 3/1222 (2013.01); G06F 3/1285 (2013.01); H04N 1/44 (2013.01)

(58) Field of Classification Search
CPC .... G06F 3/1222; G06F 3/1238; G06F 3/1279; G06K 15/4095
(Continued)

(56) References Cited

U.S. PATENT DOCUMENTS 7,835,019 B2* 11/2010 Sugishita et al. ............ 358/1.14
8,817,291 B2*  8/2014 Yamamoto et al. ......... 358/1.14
(Continued)

FOREIGN PATENT DOCUMENTS

JP    2008-211646 A    9/2008
JP    2009-140310 A    6/2009
JP    2009-294818 A   12/2009

OTHER PUBLICATIONS

Notice of Reasons for Rejection received in related JP application No. 2013-268976, mailed Feb. 10, 2017.

Primary Examiner — Gabriel Garcia
(74) Attorney, Agent, or Firm — Merchant & Gould P.C.

(57) ABSTRACT

An image processing apparatus includes an internal receiving device, a communication unit, an image processing unit, and a controller. The internal receiving device may receive authentication information. The communication unit may communicate with an external receiving device to receive the authentication information. The image processing unit may perform at least one of image reading and image formation. The controller may determine one of the internal receiving device and the external receiving device is a first receiving device of the authentication information. The controller may also perform an authentication process based on the authentication information received from the first receiving device without performing the authentication process based on a second receiving device. The second receiving device is an other of the internal receiving device and the external receiving device.

10 Claims, 9 Drawing Sheets

(58) Field of Classification Search
USPC ....... 358/1.1, 1.9, 0.14, 1.15, 1.16; 709/201,
709/203; 713/300, 310, 320, 324;
726/16, 27
See application file for complete search history.

(56) References Cited

U.S. PATENT DOCUMENTS

| | | | |
|---|---|---|---|
| 2006/0256370 A1* | 11/2006 | Murakawa | 358/1.15 |
| 2012/0250066 A1* | 10/2012 | Kikumoto et al. | 358/1.14 |
| 2014/0063534 A1* | 3/2014 | Kawai | 358/1.14 |
| 2014/0320883 A1* | 10/2014 | Ichida | 358/1.14 |
| 2015/0036167 A1* | 2/2015 | Naitoh et al. | 358/1.14 |
| 2015/0288932 A1* | 10/2015 | Smith | G06Q 30/0643 |
| | | | 348/150 |

* cited by examiner

Fig.4

■ AUTHENTICATION DEVICE SETTING

[AUTHENTICATION DEVICE STATUS]
  INTERNAL AUTHENTICATION DEVICE: NOT AVAILABLE
  EXTERNAL AUTHENTICATION DEVICE: AVAILABLE

[AUTHENTICATION DEVICE SELECTION]
- ○ NONE
- ○ INTERNAL DEVICE ONLY
- ○ EXTERNAL DEVICE ONLY
- ● EXTERNAL DEVICE FIRST

[AUTHENTICATION CARD TYPE]
- ☑ A-TYPE IC CARD
- ☑ B-TYPE IC CARD
- ☐ C-TYPE IC CARD

■ USER INFORMATION

| | UserName | Password | Card ID |
|---|---|---|---|
| 1: | AAA | ******** | 12345678 |
| 2: | BBB | ******** | 21340939 |
| 3: | CCC | ******** | 41285983 |
| 4: | DDD | ******** | 1234567890123456 |
| 5: | EEE | ******** | 45592083 |
| 6: | FFF | ******** | 26734241 |
| 7: | GGG | ******** | 92346647 |
| 8: | HHH | ******** | 8937849959919269 |
| 9: | III | ******** | 45456891 |
| 10: | JJJ | ******** | 1287476858127871 |

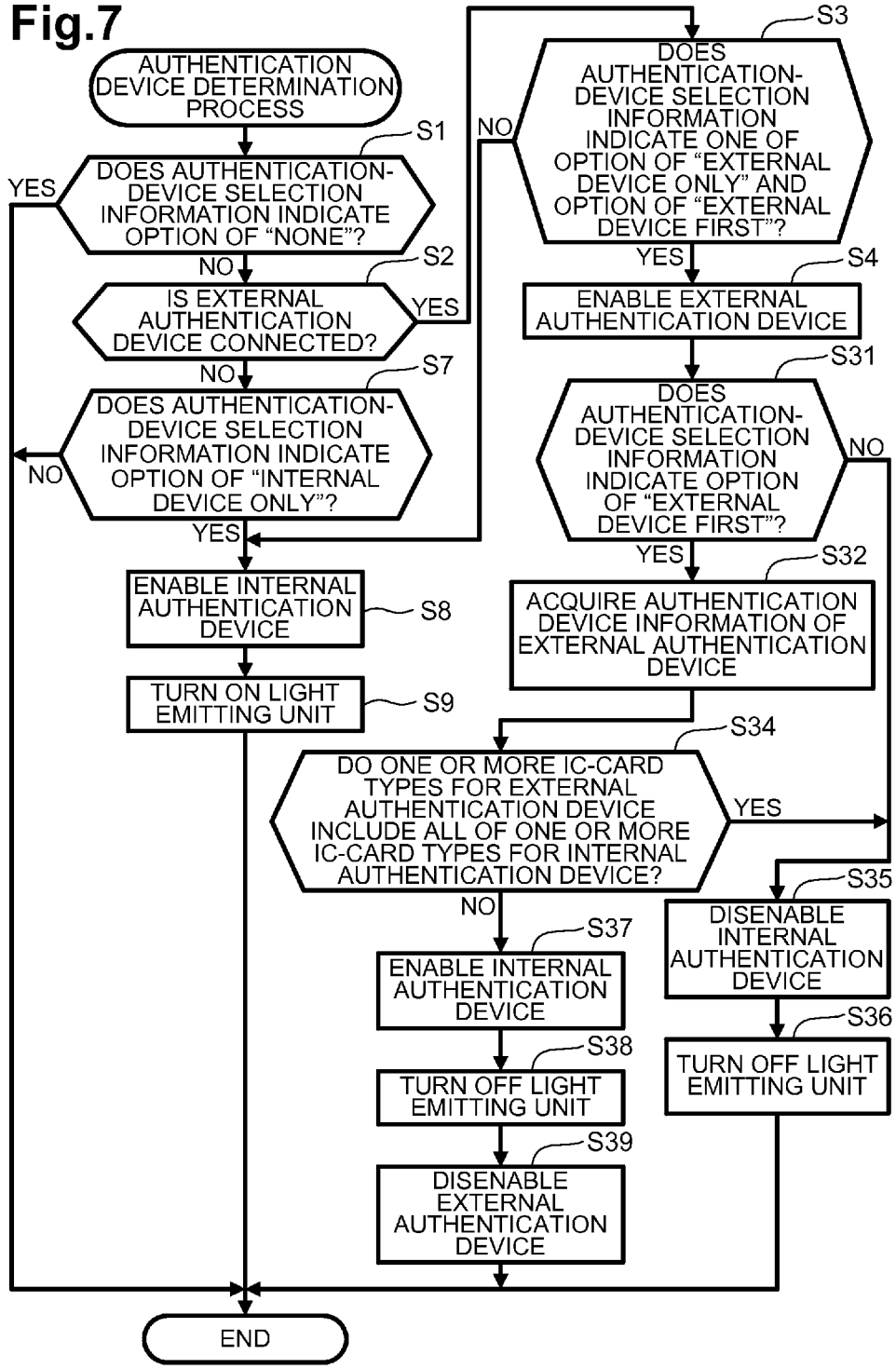

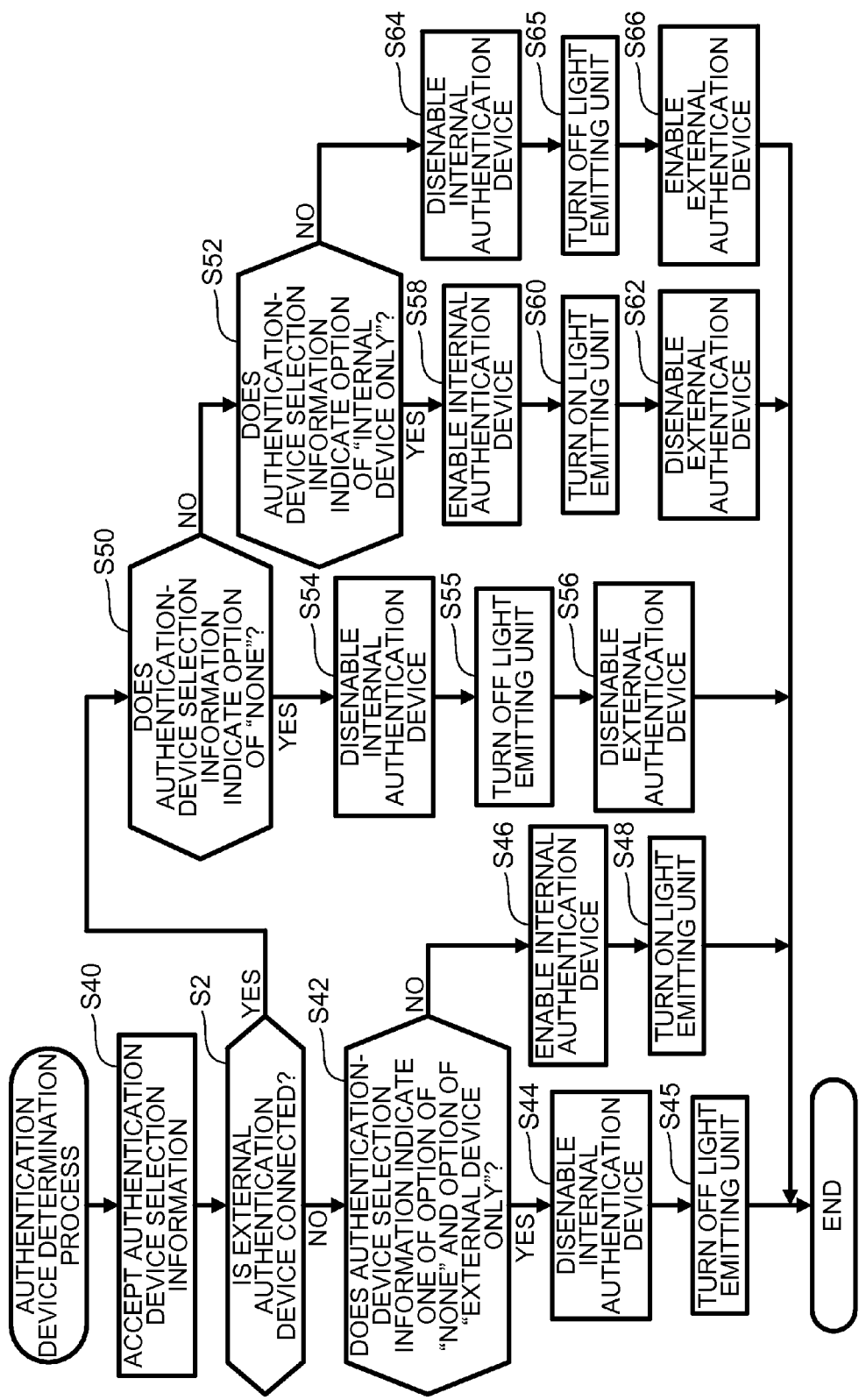

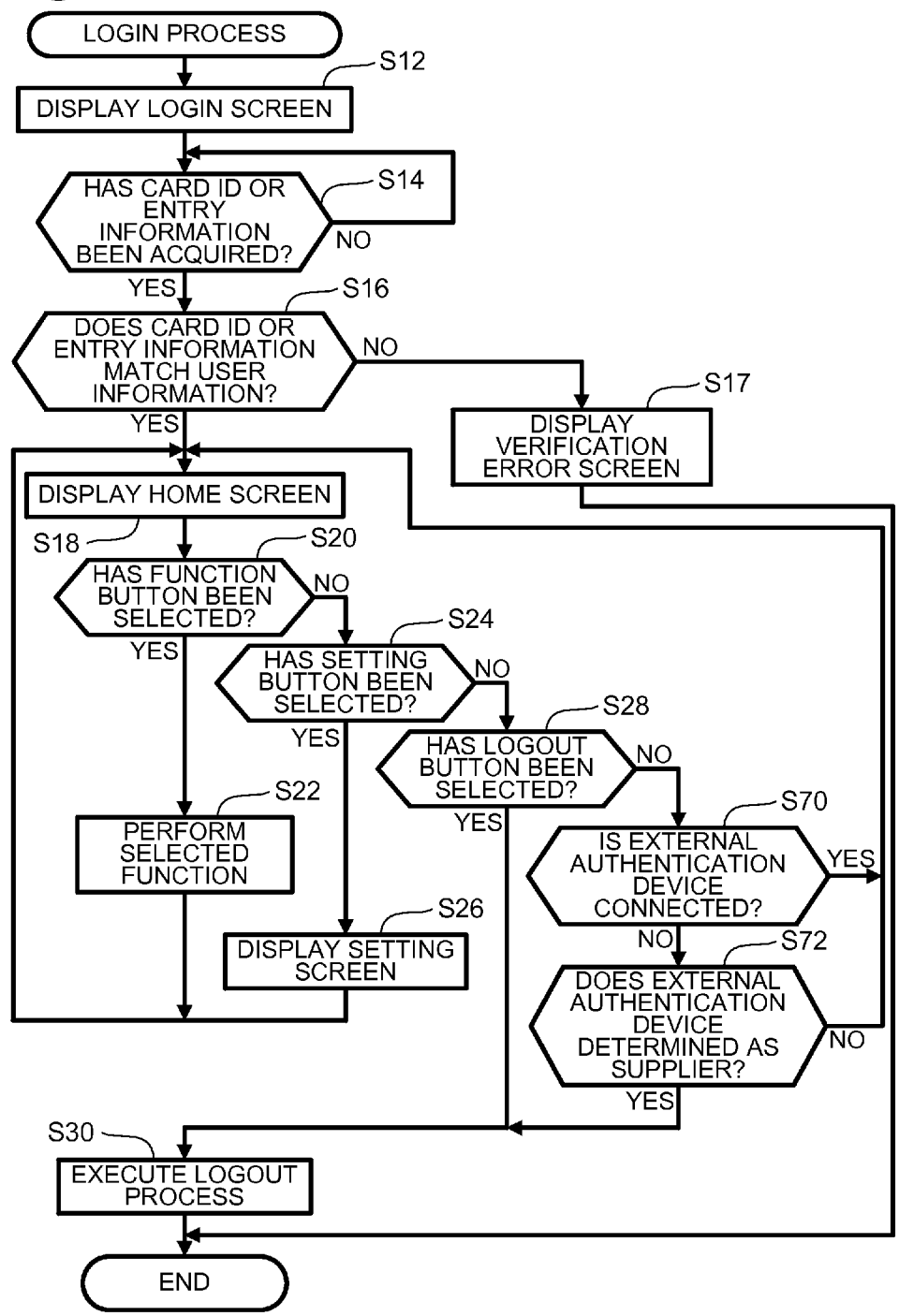

IMAGE PROCESSING APPARATUS, CONTROLLING METHOD THEREOF, AND COMPUTER-READABLE MEDIA FOR IMAGE PROCESSING AND AUTHENTICATION THEREOF USING AN INTERNAL OR EXTERNAL RECEIVING DEVICE

CROSS-REFERENCE TO RELATED APPLICATION

This application claims priority from Japanese Patent Application No. 2013-268976, filed on Dec. 26, 2013, which is incorporated herein by reference in its entirety.

TECHNICAL FIELD

Aspects described herein relate to a technique for performing an authentication process based on authentication information, a control method of receiving authentication information in the image processing apparatus, and computer-readable media for controlling image processing.

BACKGROUND

A known image forming apparatus requires an input of predetermined authentication information at the time of starting printing. Such an image forming apparatus is configured to allow an external authentication device to be attached thereto and detached therefrom. The external authentication device is configured to acquire authentication information. When the external authentication device is attached to the image forming apparatus and authentication information acquired by the external authentication device matches prestored information, the image forming apparatus permits an information processing device to transmit print information to the image forming apparatus and then performs printing.

SUMMARY

Some image processing apparatus such as an image forming apparatus may include an internal acquisition device, e.g., an internal authentication device, which may be built therein and configured to acquire authentication information.

Aspects of the present disclosure describe an image processing apparatus may comprise an internal receiving device, a communication unit, an image processing unit, and a controller. The internal receiving device may be configured to receive authentication information. The communication unit may be configured to communicate with an external receiving device configured to receive authentication information. The controller may be configured to determine, in a state that the external receiving device is connected to the image processing apparatus, one of the internal receiving device and the external receiving device is a first receiving device of the authentication information. The controller may also be configured to perform an authentication process based on the authentication information received from the first receiving device without performing the authentication process based on a second receiving device. The second receiving device is an other of the internal receiving device and the external receiving device.

A method of receiving authentication information in an image processing apparatus is disclosed. The method may comprise determining one of an internal receiving device of the image processing apparatus and an external receiving device connected to a communication unit of the image processing apparatus as a first receiving device of authentication information. The method may also comprise performing an authentication process based on the authentication information received from the first receiving device without performing the authentication process based on a second receiving device. The second receiving device is an other of the internal receiving device and the external receiving device.

Aspects of the disclosure also include one or more non-transitory, computer-readable media storing computer-readable instructions therein. When executed by at least one processor of an image processing apparatus, the computer-readable instructions may instruct the image processing apparatus to execute certain steps. The computer-readable instructions may instruct the image processing apparatus to determine one of an internal receiving device of the image processing apparatus and an external receiving device connected to a communication unit of the image processing apparatus as a first receiving device of authentication information. The computer-readable instructions may also instruct the image processing apparatus to performing an authentication process based on the authentication information received from the first receiving device without performing the authentication process based on a second receiving device. The second receiving device is an other of the internal receiving device and the external receiving device.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 4 illustrates an example setting screen when an external authentication device is determined as a supplier in the first illustrative embodiment according to one or more aspects of the disclosure.

FIG. 7 is a flowchart depicting an example authentication device determination process in a second illustrative embodiment according to one or more aspects of the disclosure.

FIG. 8 is a flowchart depicting an example authentication device determination process in a third illustrative embodiment according to one or more aspects of the disclosure.

FIG. 9 is a flowchart depicting an example login process in the third illustrative embodiment according to one or more aspects of the disclosure.

DETAILED DESCRIPTION

Figure 1:
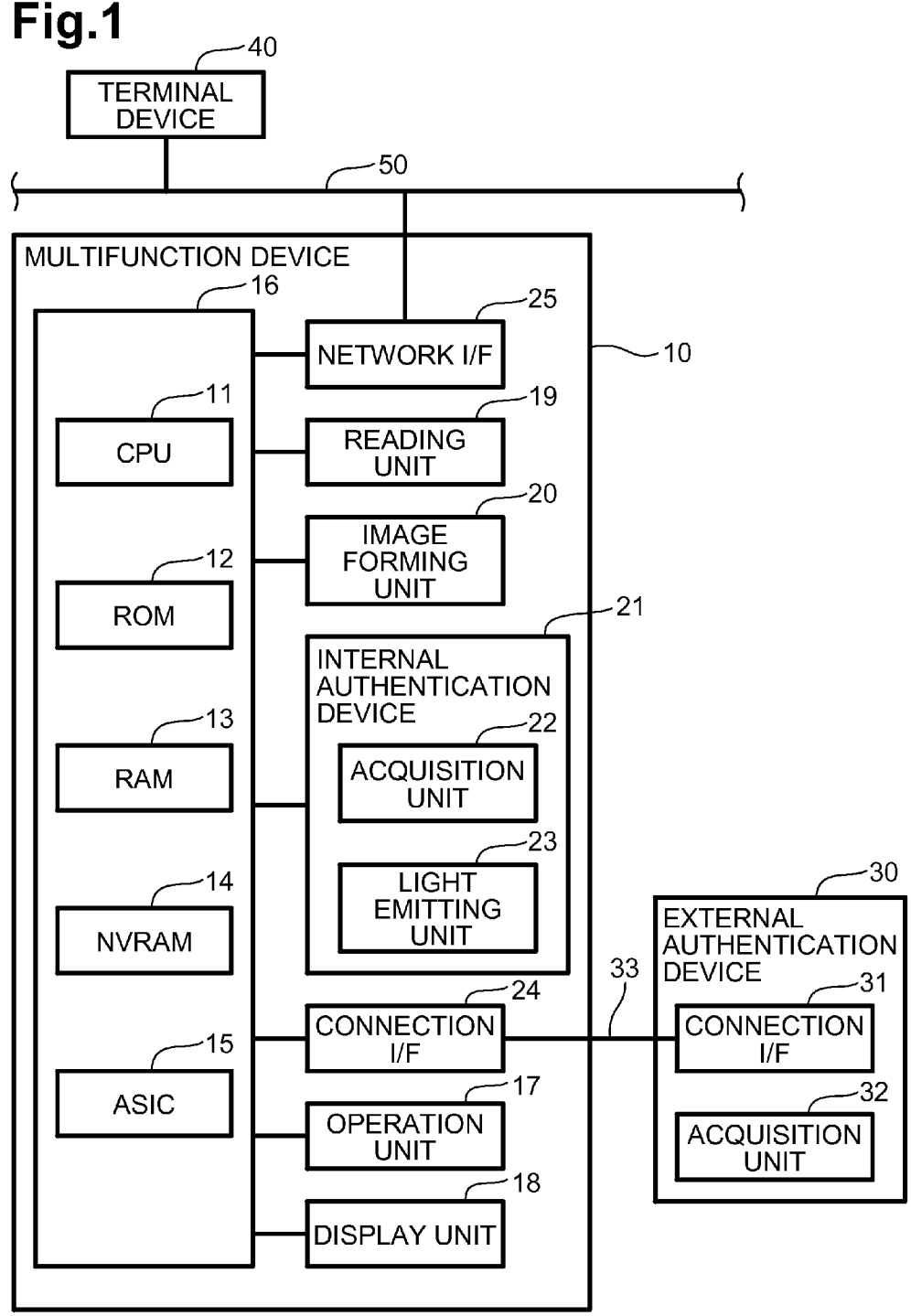
FIG. 1 is a block diagram depicting an example configuration of an image processing system in a first illustrative embodiment according to one or more aspects of the disclosure.

Various embodiments will be described in detail with reference to the drawings, wherein like reference numerals represent like parts. Reference to various embodiments does not limit the scope of the claims attached hereto. Additionally, any example set forth in the specification are not intended to be limiting and merely set forth some of the many possible embodiments for the appended claims.

Referring to FIGS. 1 to 6, a multifunction device 10 according to a first illustrative embodiment will be described.

As depicted in FIG. 1, an image processing system according to the illustrative embodiment includes the multifunction device 10 and a terminal device 40 that are connected with each other via a communication line 50.

The multifunction device 10 is an example of an image processing apparatus. The multifunction device 10 is configured to perform multiple functions, for example, a scanning function, a copying function, and a printing function. The multifunction device 10 includes a central processing unit ("CPU") 11, a read-only memory ("ROM") 12, a random-access memory ("RAM") 13, a nonvolatile random-access memory ("NVRAM") 14, an application specific integrated circuit ("ASIC") 15, an operation unit 17, a display unit 18, a reading unit 19, an image forming unit 20, an internal authentication device 21, a connection interface ("I/F") 24, and a network interface ("I/F") 25.

The ROM 12 stores various programs for controlling an operation of the multifunction device 10, such as various programs for executing an authentication device determination process and a login process. The NVRAM 14 prestores user information 65 (see FIG. 4) therein. The CPU 11 is configured to store processing results in at least one of the RAM 13 and the NVRAM 14 in response to executing various programs read from the ROM 12. As depicted in FIG. 1, a controller 16 includes the CPU 11, the ROM 12, the RAM 13, the NVRAM 14, and the ASIC 15. The ROM 12, RAM 13, NVRAM 14, and ASIC 15 represent examples of computer-readable media. Such computer-readable media can, in embodiments, include non-transitory computer-readable media, e.g., tangible media devices.

The operation unit 17 includes, for example, a plurality of buttons. The operation unit 17 is configured to allow a user to input various instructions therethrough. The display unit 18 includes a liquid crystal display and an indicator light. The display unit 18 is configured to display various images thereon under control of the CPU 11. The network I/F 25 is connected with the communication line 50 and is configured to allow the multifunction device 10 to perform communication with the terminal device 40.

The reading unit 19 is configured to read an image from a document and provide image data to the terminal device 40 under control of the CPU 11. The image forming unit 20 is configured to form an image onto a sheet based on print data provided by the terminal device 40 under control of the CPU 11. Each of the reading unit 19 and the image forming unit 20 is an example of an image processing unit.

The internal authentication device 21 is an authentication device built in the multifunction device 10. The internal authentication device 21 is configured to receive authentication information, for example by acquiring authentication information, to be used for determining whether a particular user is permitted to login to the multifunction device 10, that is, for determining whether a particular user is permitted to use at least one of the reading unit 19 and the image forming unit 20. The internal authentication device 21 includes an acquisition unit 22 and a light emitting unit 23. The acquisition unit 22 is configured to acquire authentication information of one or more specific types. For example, in the first illustrative embodiment, of various types of cards with embedded integrated circuit ("IC") chips (hereinafter, referred to as "IC cards"), the acquisition unit 22 is capable of acquiring a recorded card identification ("ID") from an IC card or smart card of A type (hereinafter, referred to as "A-type IC card"). When an A-type IC card is placed at a predetermined reading position, the acquisition unit 22 is configured to read a card ID from the A-type IC card and transmit the acquired card ID to the CPU 11. The light emitting unit 23 includes an indication light and is configured to indicate an operating status (e.g., "AVAILABLE" or "NOT AVAILABLE") of the internal authentication device 21 using the indication light. The internal authentication device 21 is an example of an internal acquisition device. The card ID is an example of authentication information.

The connection I/F 24 is configured to allow the multifunction device 10 to perform wired or wireless communication with an external device. In the first illustrative embodiment, the connection I/F 24 is connected with an external authentication device 30 via a connection cable 33. The connection I/F 24 is configured to allow the multifunction device 10 to perform wired communication with the external authentication device 30. The connection I/F 24 is further configured to allow the multifunction device to supply power to the external authentication device 30 via the connection cable 33. The connection I/F 24 is an example of a communication unit. The connection I/F 24 provides an example of an interface allowing communication (e.g., wired or wireless) with a multifunction device 30.

The external authentication device 30 is an authentication device that is externally attachable to the multifunction device 10. The external authentication device 30 is detachably connected to the connection I/F 24 of the multifunction device 10. The external authentication device 30 includes a connection interface ("I/F") 31 and an acquisition unit 32. The connection I/F 31 is connected with the connection cable 33. The connection cable 33 connects the external authentication device 30 to the multifunction device 10, allowing the external authentication device 30 to be in communication with the multifunction device 10.

This configuration may enable the multifunction device 10 and the external authentication device 30 to perform communication therebetween and the multifunction device 10 to supply power to the external authentication device 30. The external authentication device 30 is an example of an external acquisition device.

The acquisition unit 32 is configured to acquire authentication information from IC cards of one or more specific types. For example, in the first illustrative embodiment, the acquisition unit 32 is capable of acquiring recorded card IDs from an A-type IC card and from an IC card or smart card of B type (hereinafter, referred to as "B-type IC card") of IC cards of various types. When one of the A-type IC card and the B-type IC card is placed at a predetermined reading position, the acquisition unit 32 is configured to read a card ID from the one of the A-type IC card and the B-type IC and transmit the acquired card ID to the CPU 11.

The CPU 11 is configured to associate a card ID acquired by one of the authentication devices 21 and 30 with a corresponding user name and password entered through the operation unit 17 to create user information 65 and store the created user information 65 in the NVRAM 14. The CPU 11 is further configured to determine whether a particular user is permitted to login to the multifunction device 10 by verifying a card ID acquired by one of the authentication devices 21 and 30 against the user information 65 stored in the NVRAM 14 in a login process.

The user information 65 is displayed on the display unit 18. The user information 65 may also be displayed on a display unit (not depicted) of the terminal device 40. More specifically, a setting screen 60 including the user information 65 may be displayed on the display unit 18. The setting screen 60 including the user information 65 may also be displayed on the display unit of the terminal device 40 in response to a request from the terminal device 40. As depicted in FIG. 4, in the first illustrative embodiment, a card ID of eight-digit number may be acquired from an A-type IC card and a card ID of sixteen-digit number may be acquired from a B-type IC card. The user information 65 includes one or more card IDs of one of eight-digit number corresponding to an A-type IC card and sixteen-digit number corresponding to a B-type IC card.

The setting screen 60 further includes authentication-device setting information 61 as well as the user information 65. The authentication-device setting information 61 includes authentication-device status information 62, authentication-device selection information 63, and authentication-card type information 64. The authentication-device status information 62 indicates availability ("AVAILABLE" or "NOT AVAILABLE") of each of the authentication devices 21 and 30 which are determined as one of a supplier, e.g., a first receiving device, and a non-supplier, e.g., a second receiving device, in an authentication device determination process.

In the first illustrative embodiment, "AVAILABLE" indicates that a particular authentication device is supplied with power, and "NOT AVAILABLE" indicates that a particular authentication device is not supplied with power. Therefore, the multifunction device 10 is configured to receive a card ID from an enabled authentication device but not to receive any card ID from a disenabled authentication device. Thus, enabling a particular authentication device includes determining the particular authentication device as a "supplier" of a card ID, and disenabling a particular authentication device includes determining the particular authentication device as a "non-supplier" of any card ID.

The authentication-card type information 64 indicates one or more types of IC-cards from which a particular authentication device as a supplier is capable of acquiring authentication information. More specifically, the authentication-card type information 64 includes a list of types of IC cards from which the authentication device as a supplier, e.g., the internal authentication device 21 or the external authentication device 30, is capable of acquiring authentication information. The CPU 11 determines one or more IC-card types marked with checkmarks in checkboxes, respectively, as an IC card subject to authentication. That is, in an example case illustrated in FIG. 4, the CPU 11 determines both an A-type IC card and a B-type IC card from which the external authentication device 30 determined as a supplier is capable of acquiring authentication information, as an IC card subject to authentication. Nevertheless, the CPU 11 might not determine a C-type IC card as an IC card subject to authentication although the external authentication device 30 is capable of acquiring authentication information therefrom.

The authentication-device selection information 63 includes a plurality of, for example, four, options, "NONE", "INTERNAL DEVICE ONLY", "EXTERNAL DEVICE ONLY", or "EXTERNAL DEVICE FIRST". The authentication-device selection information 63 indicates one of the plurality of options which indicate which one of the authentication devices is determined as a supplier in the authentication device determination process. When the authentication-device selection information 63 indicates the option of "NONE", both of the authentication devices 21 and 30 are determined as a non-supplier. That is, any user login to the multifunction device 10 using one of the authentication devices 21 and 30 is prohibited. When the authentication-device selection information 63 indicates the option of "INTERNAL DEVICE ONLY", the internal authentication device 21 is determined as a supplier and the external authentication device 30 is determined as a non-supplier, regardless of whether the external authentication device 30 is connected with the connection I/F 24 of the multifunction device 10 and communication is available therebetween (hereinafter, this situation is referred simply to as "the external authentication device 30 is connected with the connection I/F 24 of the multifunction device 10").

When the authentication-device selection information 63 indicates the option of "EXTERNAL DEVICE ONLY", the external authentication device 30 is determined as a supplier and the internal authentication device 21 is determined as a non-supplier in a case where the external authentication device 30 is connected with the connection I/F 24 of the multifunction device 10. In a case where the external authentication device 30 is not connected with the connection I/F 24 of the multifunction device 10, both of the authentication devices 21 and 30 are determined as a non-supplier. When the authentication-device selection information 63 indicates the option of "EXTERNAL DEVICE FIRST", the external authentication device 30 is determined as a supplier and the internal authentication device 21 is determined as a non-supplier in a case where the external authentication device 30 is connected with the connection I/F 24 of the multifunction device 10. In a case where the external authentication device 30 is not connected with the connection I/F 24 of the multifunction device 10, the internal authentication device 21 is determined as a supplier and the external authentication device 30 is determined as a non-supplier.

That is, in the first illustrative embodiment, it is prohibited that both of the authentication devices 21 and 30 are determined as a supplier at the same time when the authentication-device selection information 63 indicates any one of the options. Of the contents displayed on the setting screen 60, the selection of the options for the authentication-device selection information 63 and the details of the user information 65 may be changed through the operation unit 17 of the multifunction device 10 or an operation unit (not depicted) of the terminal device 40. In the first illustrative embodiment, among the four options, the authentication-device selection information 63 indicates the option of "EXTERNAL DEVICE FIRST" that has been selected by a person responsible for maintaining the multifunction device 10. The authentication-device selection information 63 is an example of setting information.

Figure 2:
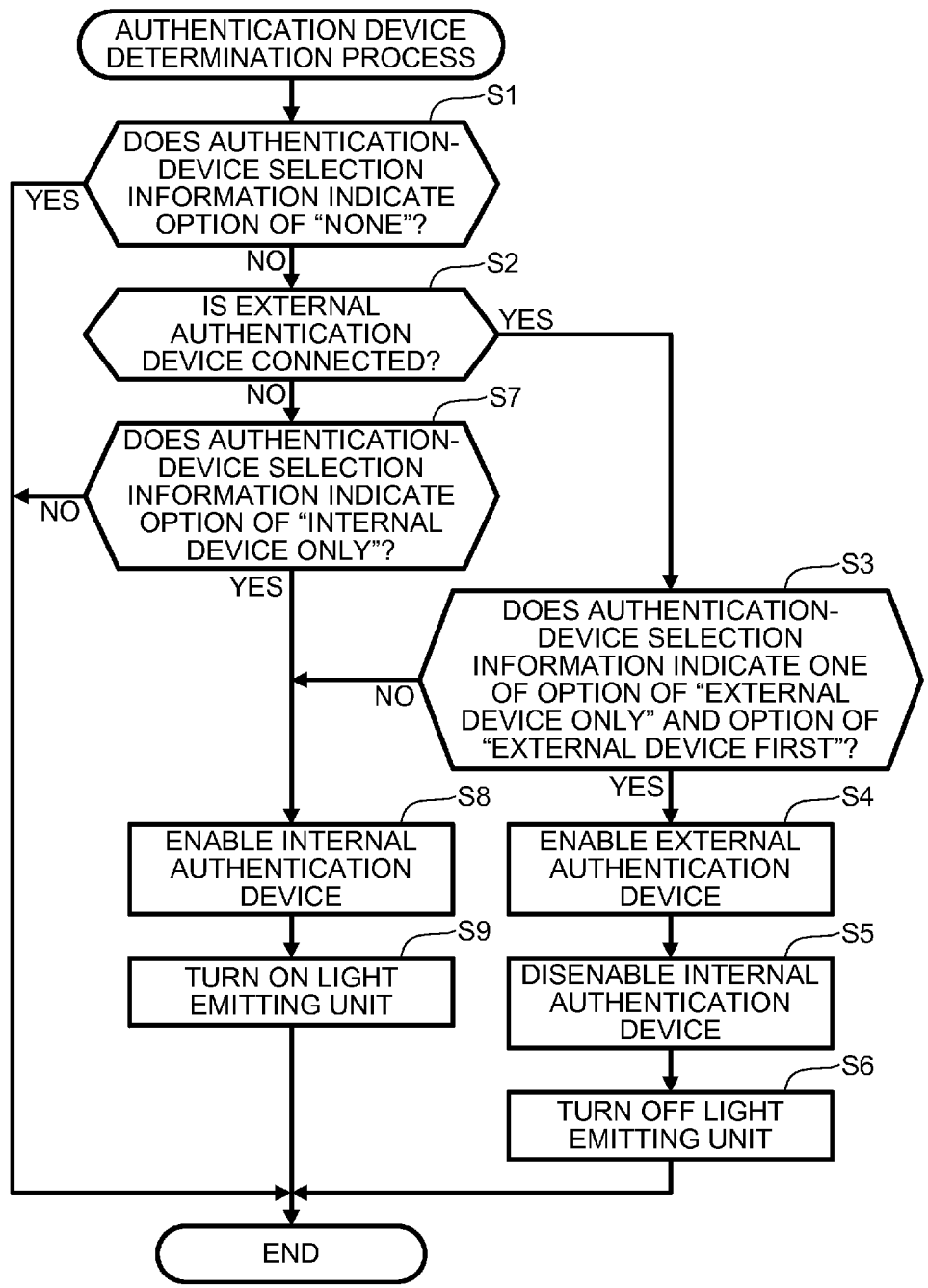
FIG. 2 is a flowchart depicting an example authentication device determination process in the first illustrative embodiment according to one or more aspects of the disclosure.

Referring to FIGS. 2, 3, 4, 5, and 6, the authentication device determination process and the login process executed by the CPU 11 of the multifunction device 10 will be described. The authentication device determination process is executed for determining a particular authentication device as a supplier. The authentication device determination process is executed at certain intervals while power of the multifunction device 10 is on. As the CPU 11 starts the authentication device determination process, as depicted in FIG. 2, the CPU 11 determines whether the authentication-device selection information 63 indicates the option of "NONE" (e.g., step S1).

When the CPU 11 determines that the authentication-device selection information 63 indicates the option of "NONE" (e.g., YES in step S1), the CPU 11 ends the authentication device determination process without enabling none of the authentication devices 21 and 30. When the CPU 11 determines that the authentication-device selection information 63 indicates another option other than the option of "NONE" (e.g., NO in step S1), the CPU 11 determines whether the external authentication device 30 is connected with the connection I/F 24 of the multifunction device 10 (e.g., step S2).

More specifically, as the external authentication device 30 is connected to the connection I/F 24 of the multifunction device 10, the CPU 11 starts supplying power to the external authentication device 30 and then requests transmission of authentication-device information of the external authentication device 30. The authentication-device information includes, for example, a model number and/or information on which one or more types of IC cards from which the external authentication device 30 is capable of acquiring authentication information. When the CPU 11 receives such authentication-device information from the external authentication device 30 in response to the request to the external authentication device 30, the CPU 11 determines that the external authentication device 30 is connected with the connection I/F 24 of the multifunction device 10. When the CPU 11 does not receive any response from the external authentication device 30 in response to the request to the external authentication device 30, the CPU 11 determines that the external authentication device 30 is not connected with the connection I/F 24 of the multifunction device 10.

When the CPU 11 determines that the external authentication device 30 is connected with the connection I/F 24 of the multifunction device 10 (e.g., YES in step S2), the CPU 11 determines whether the authentication-device selection information 63 indicates one of the option of "EXTERNAL DEVICE ONLY" and the option of "EXTERNAL DEVICE FIRST" (e.g., step S3). When the CPU 11 determines that the authentication-device selection information 63 indicates one of the option of "EXTERNAL DEVICE ONLY" and the option of "EXTERNAL DEVICE FIRST" (e.g., YES in step S3), the CPU 11 enables the external authentication device 30 (e.g., step S4). Enabling the external authentication device 30 includes continuing power supply to the external authentication device 30 or starting power supply to the external authentication device 30 via the connection I/F 24. Subsequently, the CPU 11 disenables the internal authentication device 21 (e.g., step S5). Disenabling the internal authentication device 21 includes stopping the ongoing power supply to the internal authentication device 21 or continuing stopping of power supply to the internal authentication device 21. The CPU 11 turns off the light emitting unit 23 of the internal authentication device 21 (e.g., step S6) and ends the authentication device determination process. That is, the CPU 11 determines the external authentication device 30 as a supplier and the internal authentication device 21 as a non-supplier.

When the CPU 11 determines that the external authentication device 30 is not connected with the connection I/F 24 of the multifunction device 10 (e.g., NO in step S2), the CPU 11 determines whether the authentication-device selection information 63 indicates the option of "INTERNAL DEVICE ONLY" (e.g., step S7). When the CPU 11 determines that the authentication-device selection information 63 indicates one of the option of "EXTERNAL DEVICE ONLY" and the option of "EXTERNAL DEVICE FIRST" (e.g., NO in step S7), the CPU 11 ends the authentication device determination process.

When the CPU 11 determines that the authentication-device selection information 63 indicates the option of "INTERNAL DEVICE ONLY" (e.g., YES in step S7), the CPU 11 enables the internal authentication device 21 (e.g., step S8). Enabling the internal authentication device 21 includes continuing power supply to the internal authentication device 21 or starting power supply to the internal authentication device 21 via the connection I/F 24. The CPU 11 turns on the light emitting unit 23 of the internal authentication device 21 (e.g., step S9) and ends the authentication device determination process. That is, the CPU 11 determines the internal authentication device 21 as a supplier and the external authentication device 30 as a non-supplier.

In step S3, when the CPU 11 determines that the authentication-device selection information 63 indicates the option of "INTERNAL DEVICE ONLY" (e.g., NO in step S3), the CPU 11 disenables the external authentication device 30. Subsequent to this, the CPU 11 executes processing of steps S8 and S9 and ends the authentication device determination process. That is, the CPU 11 determines the internal authentication device 21 as a supplier and the external authentication device 30 as a non-supplier.

Figure 3:
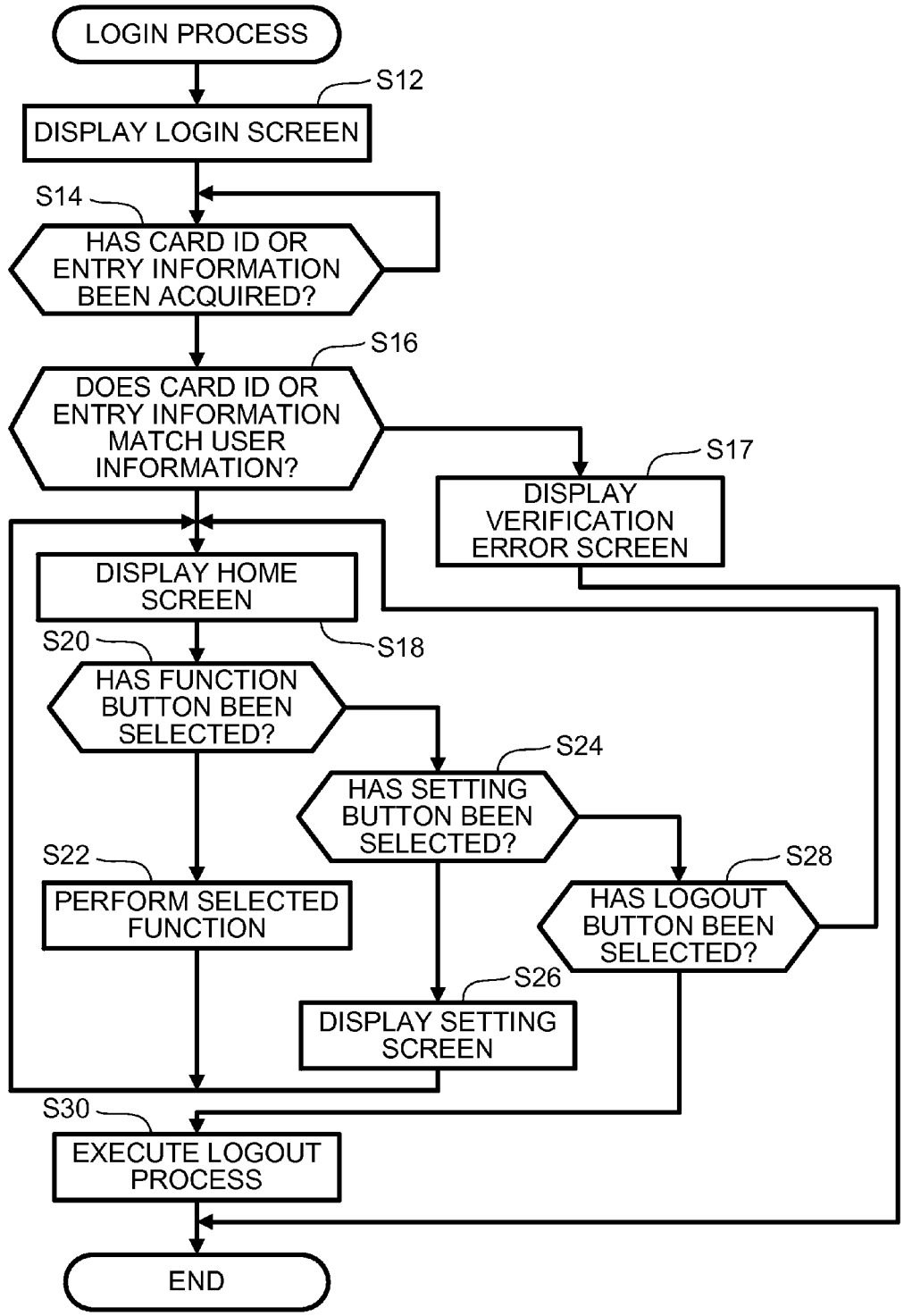
FIG. 3 is a flowchart depicting an example login process in the first illustrative embodiment according to one or more aspects of the disclosure.
Figure 5:
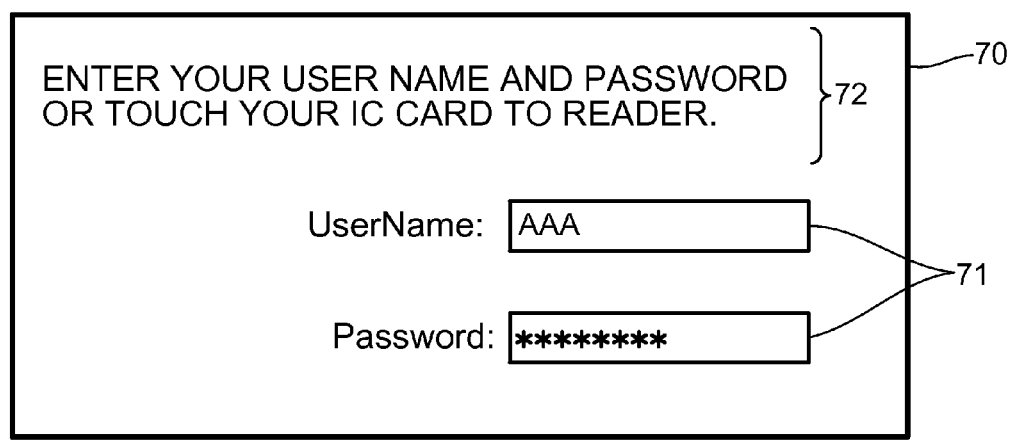
FIG. 5 illustrates an example login screen in the first illustrative embodiment according to one or more aspects of the disclosure.
Figure 6:
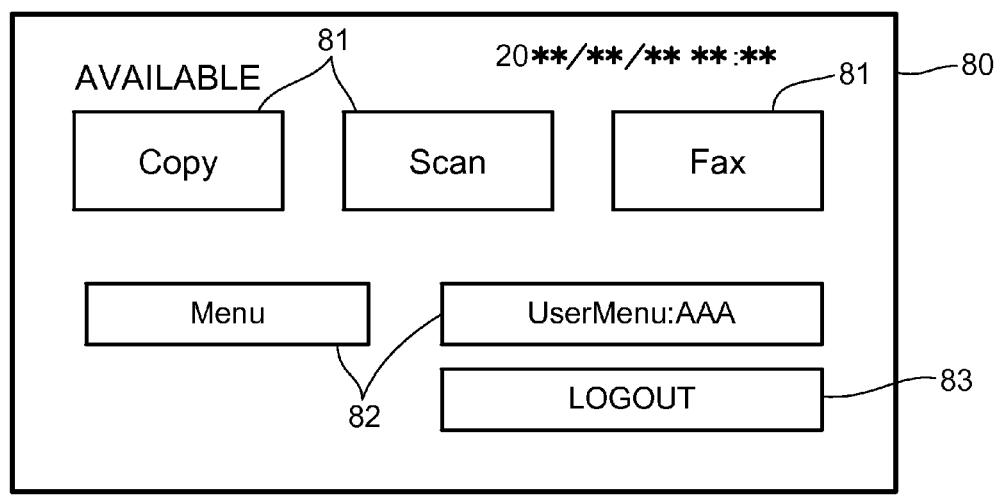
FIG. 6 illustrates an example home screen in the first illustrative embodiment according to one or more aspects of the disclosure.

Referring to FIG. 3, the login process will be described below. The login process is executed in response to a user's input operation performed through the operation unit 17. As the CPU 11 starts the login process, as depicted in FIG. 5, the CPU 11 displays a login screen 70 on the display unit 18 (e.g., step S12). As depicted in FIG. 5, for example, the login screen 70 includes entry fields 71, in which a user name and a password are to be entered, respectively, and a message 72. The message 72 indicates, for example, that one of the authentication devices 21 and 30 is available for authentication as well as entry of a user name and password.

Subsequent to displaying the login screen 70, the CPU 11 waits for receipt of a card ID from a particular authentication device determined as a supplier or entry of information into the entry fields 71 by a user (e.g., NO in step S14).

When the CPU 11 determines that a card ID has been received from the particular authentication device determined as a supplier or determines that particular information has been entered into the entry fields 71 by a particular user (e.g., YES in step S14), the CPU 11 verifies one of the received card ID and the particular information entered in the entry fields 71 against the user information 65 stored in the NVRAM 14 (e.g., step S16). When the CPU 11 determines that one of the received card ID and the particular information entered in the entry fields 71 does not match the user information 65 stored in the NVRAM 14 (e.g., NO in step S16), the CPU 11 does not permit the particular user to login to the multifunction device 10 and displays a verification error screen on the display unit 18 (e.g., step S17). Then, the CPU 11 ends the login process.

When the CPU 11 determines that one of the received card ID and the information entered in the entry fields 71 matches the user information 65 stored in the NVRAM 14 (e.g., YES in step S16), the CPU 11 permits the particular user to login to the multifunction device 10, changes a state of the multifunction device 10 to a state where the reading unit 19 and the image forming unit 20 are both available, and displays a home screen 80 (see FIG. 6) on the display unit 18 (e.g., step S18).

Any authentication device that is determined as a non-supplier is incapable of acquiring a card ID from an IC card. Thus, the CPU 11 does not receive any card ID from the non-supplier authentication device. Therefore, the CPU 11 does not perform a verification of a card ID received from the authentication device that is determined as a non-supplier against the user information 65 nor determine availability of the reading unit 19 and the image forming unit 20 based on the verification result.

Subsequent to displaying the home screen 80, the CPU 11 waits for a selection of one of buttons 81, 82, 83 displayed on the home screen 80 (e.g., NO in step S20, NO in step S24, and NO in step S28). The home screen 80 includes the function buttons 81 associated with functions using at least one of the reading unit 19 and the image forming unit 20, for example, a "COPY" button, a "SCAN" button, and a "FAX" button. When the CPU 11 determines that one of the function buttons 81 has been selected by the user (e.g., YES in step S20), the CPU 11 performs a particular function associated with the selected button 81 (e.g., step S22). Then, the CPU 11 returns to step S18 and executes the processing of step S18 and subsequent steps.

The home screen 80 further includes the setting buttons 82 for allowing a user to perform various settings, for example, a "MENU" button and a "USER MENU" button. When the CPU 11 determines that one of the setting buttons 82 has been selected by the user (e.g., NO in step S20 and YES in step S24), the CPU 11 displays the setting screen 60 on the display unit 18 (e.g., step S26). The user changes the selection of the current option for authentication-device selection information 63 to another and/or updates the user information 65 on the setting screen 60. The CPU 11 returns to step S18 and executes the processing of step S18 and subsequent steps.

The home screen 80 further includes the logout button 83 for allowing the user to log out of the multifunction device 10. When the CPU 11 determines that the logout button 83 has been selected by the user (e.g., NO in step S20, NO in step S24, and YES in step S28), the CPU 11 executes a logout process (e.g., step S30) and ends the login process.

In the first illustrative embodiment, the CPU 11 determines one of the internal authentication device 21 and the external authentication device 30 as a supplier of a card ID. Further, the CPU 11 determines whether the reading unit 19 and the image forming unit 20 are available for a particular user based on the card ID acquired by the authentication device determined as a supplier, and does not perform such a determination based on a card ID acquired by the authentication device determined as a non-supplier since the non-supplier authentication device does not acquire any card ID from an IC card. Thus, this configuration may prevent or reduce occurrence of problems caused due to determination of availability of the reading unit 19 and the image forming unit 20 based on card IDs acquired by both the internal and external authentication devices 21 and 30, e.g., a malfunction caused due to a conflict between availability determination results of both the internal and external authentication devices 21 and 30.

In the first illustrative embodiment, the CPU 11 determines whether the external authentication device 30 is connected with the connection I/F 24 of the multifunction device 10 (e.g., step S2). Therefore, based on this determination result, the CPU 11 may further determine whether a card ID can be received from the external authentication device 30.

In the first illustrative embodiment, the CPU 11 determines the external authentication device 30 as a supplier (e.g., step S4) in response to the determination that the external authentication device 30 is connected with the connection I/F 24 of the multifunction device 10 (e.g., YES in step S2). When the external authentication device 30 is attached to the multifunction device 10 although the multifunction device 10 is equipped with the internal authentication device 21, it is predicted that the external authentication device 30 will be used. Therefore, based on this prediction, the CPU 11 determines the external authentication device 30 as a supplier, thereby not requiring the user to select an authentication device to be used. Thus, convenience for the user of the multifunction device 10 may be increased.

In the first illustrative embodiment, the CPU 11 determines the internal authentication device 21 as a supplier (e.g., step S8) based on the determination that the external authentication device 30 is not connected with the connection I/F 24 of the multifunction device 10 (e.g., NO in step S2). Therefore, when the external authentication device 30 is not connected with the connection I/F 24 of the multifunction device 10, this configuration may reduce or prevent the external authentication device 30 from being mistakenly determined as a supplier.

In the first illustrative embodiment, when the CPU 11 determines the internal authentication device 21 as a supplier and enables the internal authentication device 21 (e.g., step S8), the CPU 11 turns on the light emitting unit 23 of the internal authentication device 21 (e.g., step S9). Therefore, this configuration may notify the user that the internal authentication device 21 is determined as a supplier through lighting-on of the light emitting unit 23.

Referring to FIG. 7, a multifunction device 10 according to a second illustrative embodiment will be described below. In contrast to the first illustrative embodiment, according to the second illustrative embodiment, in the authentication device determination process, one or more types of IC cards from which the internal authentication device 21 is capable of acquiring authentication information and one of more types of IC cards from which the external authentication device 30 is capable of acquiring authentication information are compared with each other, and a particular authentication device is determined as a supplier based on the comparison result. The process of determining a particular authentication device as a supplier based on the comparison result is executed when the authentication-device selection information 63 indicates the option of "EXTERNAL DEVICE FIRST". In the second illustrative embodiment, the authentication-device selection information 63 indicates the option of "EXTERNAL DEVICE FIRST" that has been selected by the person responsible for managing the multifunction device 10. In the description below, the detailed description of the common part will be omitted.

Referring to FIG. 7, an authentication device determination process according to the second illustrative embodiment will be described. When the CPU 11 enables the external authentication device 30 (e.g., step S4) after starting the authentication device determination process, the CPU 11 then determines whether the authentication-device selection information 63 indicates the option of "EXTERNAL DEVICE FIRST" (e.g., step S31).

When the authentication-device selection information 63 indicates the option of "EXTERNAL DEVICE FIRST" (e.g., YES in step S31), the CPU 11 acquires authentication-device information, e.g., information on one or more types of IC cards from which the external authentication device 30 is capable of acquiring authentication information, from a response from the external authentication device 30 (e.g., step S32). The CPU 11 also acquires information on one or more types of IC cards from which the internal authentication device 21 is capable of acquiring authentication information. The CPU 11 may acquire such information from the internal authentication device 21 or from one of the ROM 12 and the NVRAM 14 that may store such information.

The CPU 11 compares the available IC-card types between the external authentication device 30 and the internal authentication device 21 (e.g., step S34). When the CPU 11 determines that one or more types of IC cards from which the external authentication device 30 is capable of acquiring authentication information (hereinafter, referred to as "one or more IC-card types available for the external authentication device 30") include all of one or more types of IC cards from which the internal authentication device 21 is capable of acquiring authentication information (hereinafter, referred to as "one or more IC-card types available for the internal authentication device 21") (e.g., YES in step S34), the CPU 11 disenables the internal authentication device 21 (e.g., step S35). The CPU 11 turns off the light emitting unit 23 of the internal authentication device 21 (e.g., step S36) and ends the authentication device determination process. That is, the CPU 11 determines the external authentication device 30 as a supplier and the internal authentication device 21 as a non-supplier.

When the CPU 11 determines that the authentication-device selection information 63 indicates the option of "EXTERNAL DEVICE ONLY" in step S31 (e.g., NO in step S31), the CPU 11 executes the processing of steps S35 and S36 as described above and then ends the authentication device determination process. That is, the CPU 11 determines the external authentication device 30 as a supplier and the internal authentication device 21 as a non-supplier.

When the CPU 11 determines that one or more IC-card types for available the internal authentication device 21 include all of the one or more IC-card types available for the external authentication device 30 (e.g., NO in step S34), the CPU 11 enables the internal authentication device 21 (e.g., step S37). The CPU 11 turns on the light emitting unit 23 of the internal authentication device 21 (e.g., step S38). The CPU 11 disenables the external authentication device 30 (e.g., step S39) and ends the authentication device determination process. Disenabling the external authentication device 30 includes stopping the ongoing power supply to the external authentication device 30 or continuing stopping of power supply to the external authentication device 30. That is, the CPU 11 determines the internal authentication device 21 as a supplier and the external authentication device 30 as a non-supplier.

In the second illustrative embodiment, when the CPU 11 determines that the external authentication device 30 is connected with the connection I/F 24 of the multifunction device 10 (e.g., step S2) and the one or more IC-card types available for the external authentication device 30 include all of the one or more IC-card types available for the internal authentication device 21 (e.g., YES in step S34), the CPU 11 determines the external authentication device 30 as a supplier.

When the one or more IC-card types available for the external authentication device 30 include all of the one or more IC-card types available for the internal authentication device 21, the number of IC-card types available for the external authentication device 30 is greater or equal to the number of IC-card types available for the internal authentication device 21. That is, when the external authentication device 30 is determined as a supplier, there is no need to acquire a card ID from the internal authentication device 21. Therefore, in the above case, determining the external authentication device 30 as a supplier may enable the CPU 11 to acquire card IDs from IC cards of more types.

When the one or more IC-card types available for the internal authentication device 21 include all of the one or more IC-card types available for the external authentication device 30 (e.g., NO in step S34), the CPU 11 does not determine the internal authentication device 21 as a non-supplier. Accordingly, by doing so, occurrence of a situation in which a user having an IC card that is available for use in the internal authentication device 21 is suddenly not permitted to login to the multifunction device 10 may be prevented or reduced.

Referring to FIGS. 8 and 9, a multifunction device 10 according to a third illustrative embodiment will be described below. In contrast to the first and second illustrative embodiments, in the third illustrative embodiment, the multifunction device 10 is configured to accept a user's selection of one of the options for the authentication-device selection information 63 during the authentication device determination process and determines a particular authentication device as a supplier.

In contrast to the first and second illustrative embodiments, in the third illustrative embodiment, in the login process, when the CPU 11 determines that the external authentication device 30 is not connected with the multifunction device 10 in a state where the CPU 11 permits a particular user to login to the multifunction device 10 using the card ID acquired by the external authentication device 30 that is determined as a supplier, the CPU 11 logs out of the user ID from the multifunction device 10. In the description below, the detailed description of the common part will be omitted.

Referring to FIGS. 8 and 9, an authentication device determination process and a login process according to the third illustrative embodiment will be described. As depicted in FIG. 8, as the CPU 11 starts the authentication device determination process, the CPU 11 accepts a selection of one of the options for the authentication-device selection information 63 (e.g., step S40). When the CPU 11 accepts the selection of one of the options in the authentication-device selection information 63 through the operation unit 17, the CPU 11 determines whether the external authentication device 30 is connected with the connection I/F 24 of the multifunction device 10 (e.g., step S2).

When the CPU 11 determines that the external authentication device 30 is not connected with the connection I/F 24 of the multifunction device 10 (e.g., NO in step S2), in step S40, the CPU 11 determines whether the authentication-device selection information 63 indicates one of the option of "NONE" and the option of "EXTERNAL DEVICE ONLY" (e.g., step S42). In step S40, when the CPU 11 determines that the authentication-device selection information 63 indicates one of the option of "NONE" and the option of "EXTERNAL DEVICE ONLY" (e.g., YES in step S42), the CPU 11 disenables the internal authentication device 21 (e.g., step S44). The CPU 11 turns off the light emitting unit 23 of the internal authentication device 21 (e.g., step S45) and ends the authentication device determination process. That is, the CPU 11 determines both the internal authentication device 21 and the external authentication device 30 as a non-supplier.

When the CPU 11 determines that the authentication-device selection information 63 indicates one of the option of "INTERNAL DEVICE ONLY" and the option of "EXTERNAL DEVICE FIRST" in step S40 (e.g., NO in step S42), the CPU 11 enables the internal authentication device 21 (e.g., step S46). The CPU 11 turns on the light emitting unit 23 of the internal authentication device 21 (e.g., step S48) and ends the authentication device determination process. That is, the CPU 11 determines the internal authentication device 21 as a supplier and the external authentication device 30 as a non-supplier.

When the CPU 11 determines that the external authentication device 30 is connected with the connection I/F 24 of the multifunction device 10 (e.g., YES in step S2), in step S50, the CPU 11 determines which one of the options the authentication-device selection information 63 indicates. In step S50, when the CPU 11 determines that the authentication-device selection information 63 indicates the option of "NONE" (e.g., YES in step S50), the CPU 11 disenables the internal authentication device 21 (e.g., step S54). The CPU 11 turns off the light emitting unit 23 of the internal authentication device 21 (e.g., step S55). The CPU 11 also disenables the external authentication device 30 (e.g., step S56) and ends the authentication device determination process. That is, the CPU 11 determines both the internal authentication device 21 and the external authentication device 30 as a non-supplier.

In step S52, when the CPU 11 determines that the authentication-device selection information 63 indicates the option of "INTERNAL DEVICE ONLY" (e.g., NO in step S50 and YES in step S52), the CPU 11 enables the internal authentication device 21 (e.g., step S58). The CPU 11 turns on the light emitting unit 23 of the internal authentication device 21 (e.g., step S60). The CPU 11 disenables the external authentication device 30 (e.g., step S62) and ends the authentication device determination process. That is, the CPU 11 determines the internal authentication device 21 as a supplier and the external authentication device 30 as a non-supplier.

In step S52, when the CPU 11 determines that the authentication-device selection information 63 indicates one of the option of "EXTERNAL DEVICE ONLY" and the option of "EXTERNAL DEVICE FIRST" (e.g., NO in step S50 and NO in step S52), the CPU 11 disenables the internal authentication device 21 (e.g., step S64). The CPU 11 turns off the light emitting unit 23 of the internal authentication device 21 (e.g., step S65). The CPU 11 enables the external authentication device 30 (e.g., step S66) and ends the authentication device determination process. That is, the CPU 11 determines the external authentication device 30 as a supplier and the internal authentication device 21 as a non-supplier.

Referring to FIG. 9, a login process according to the third illustrative embodiment will be described below. In the login process, when the CPU 11 permits a particular user to login to the multifunction device 10 based on one of a card ID received from a particular authentication device determined as a supplier and input information inputted in the entry fields 71 by the particular user, the CPU 11 displays a home screen 80 on the display unit 18 (e.g., step S18). Subsequent to displaying the home screen 80, the CPU 11 waits for a selection of one of the buttons 81, 82 and 83 displayed on the home screen 80 (e.g., NO in step S20, NO in step S24, and NO in step S28) and determines whether the external authentication device 30 is connected with the connection I/F 24 of the multifunction device 10 (e.g., step S70).

When the CPU 11 determines that the external authentication device 30 is connected with the connection I/F 24 of the multifunction device 10 (e.g., YES in step S70), the CPU 11 returns to step S18 and executes the processing of step S18 and subsequent steps. When the CPU 11 determines that the external authentication device 30 is not connected with the connection I/F 24 of the multifunction device 10 (e.g., NO in step S70), the CPU 11 determines which one of the authentication devices has been determined as a supplier (e.g., step S72). When the CPU 11 determines that the internal authentication device 21 is determined as a supplier (e.g., NO in step S72), i.e., when the CPU 11 permits the particular user to login to the multifunction device 10 based on the card ID received from the internal authentication device 21, the CPU 11 returns to step S18 and executes the processing of step S18 and subsequent steps.

When the CPU 11 determines that the external authentication device 30 is determined as a supplier (e.g., YES in step S72), i.e., the CPU 11 permits the particular user to login to the multifunction device 10 based on the card ID received from the external authentication device 30, the CPU executes the logout process (e.g., step S30) and ends the login process.

In the third illustrative embodiment, the CPU 11 determines one of the internal authentication device 21 and the external authentication device 30 as a supplier in accordance with the selection of one of the options for the authentication-device selection information 63 by the particular user (e.g., step S40). Thus, this configuration may prevent or reduce a determination of a supplier that the particular user does not intend.

In the third illustrative embodiment, when the CPU 11 permits the particular user to login to the multifunction device 10 based on the card ID acquired from the external authentication device 30 (e.g., YES in step S16) and then determines the external authentication device 30 is not connected with the connection I/F 24 of the multifunction device 10 (e.g., NO in step S70), that is, when the establishment of the connection between the external authentication device 30 and the multifunction device 10 is disconnected, the CPU 11 executes the logout process (e.g., step S30) and causes the reading unit 19 and the image forming unit 20 to become unavailable. When communication between the multifunction device 10 and the external authentication device 30 is broken, it is expected that using the reading unit 19 and the image forming unit 20 has been completed. In response to this, the reading unit 19 and the image forming unit 20 are caused to become unavailable, thereby increasing convenience of the multifunction device 10.

After using the reading unit 19 and/or the image forming unit 20, if a particular user removes the external authentication device 30 from the multifunction device 10 but forgets to log out of the multifunction device 10, this configuration may prevent another user who is not permitted to login to the multifunction device 10 from using the reading unit 19 and/or the image forming unit 20 without permission.

The technique according to the aspects of the disclosure is not limited to the particular illustrative embodiments described above and with reference to the accompanying drawings. Various changes, arrangements, and modifications may be applied therein without departing from the spirit and scope of the disclosure. Variations of the illustrative embodiments are enumerated below.

The "image processing apparatus" is not limited to the multifunction device. In other embodiments, for example, the "image processing apparatus" may include an image reading apparatus including a scanning function only and an image forming apparatus including a printing function only.

The "acquisition device" is not limited to the device using the card authentication method in which a card ID recorded an IC card is acquired. In other embodiments, for example, the "acquisition device" may be a device using a biometric authentication method in which authentication may be performed using biometric information, e.g., a fingerprint, a retina, or a vein. In a case where the "acquisition device" is a device using the biometric authentication method, the "authentication information" may be a fingerprint image, a retinal capillary image, or a vein image.

The "internal acquisition device" and the "external acquisition device" might not necessarily use the same authentication method. The "internal acquisition device" and the "external acquisition device" may use different authentication methods, respectively.

The "controller" is configured to execute the above-described processes using the single CPU 11 only. Nevertheless, the aspects of the disclosure might not be limited to this configuration. For example, in other embodiments, the controller may be configured to execute the processes using two or more CPUs, using only a hardware configuration, e.g., the ASIC 15, or using both one or more CPUs and one or more hardware configurations.

In the above-described illustrative embodiments, the CPU 11 compares authentication information, e.g., a card ID acquired by one of the authentication devices 21 and 30, with verification information, e.g., the user information 65. Nevertheless, in other embodiments, for example, one of the authentication devices 21 and 30 that has acquired authentication information may be configured to compare the authentication information with the verification information and transmit the comparison result to the RAM 13. The CPU 11 may be configured to determine whether a particular user is permitted to login to the multifunction device 10 based on the comparison result transmitted from the one of the authentication devices 21 and 30. In this case, the verification information may be stored in each of the authentication devices 21 and 30.

In the above-described illustrative embodiments, in the authentication device determination process, the CPU 11 supplies power to an enabled authentication device and does not supply power to a disenabled authentication device. Nevertheless, in other embodiments, for example, the CPU 11 may be configured to acquire authentication information from the enabled authentication device and not to acquire authentication information from the disenabled authentication device. In this case, also, the CPU 11 might not perform a verification of a card ID acquired from the authentication device that is determined as a non-supplier against the user information 65 nor determine whether a particular user is permitted to use the reading unit 19 and the image forming unit 20 based on the verification result. Further, since the CPU 11 does not supply power to the disenabled authentication device, power consumed by the multifunction device 10 may be reduced. In all of the above embodiments, the CPU 11 receives authentication information from the enabled authentication device without receiving authentication information from the disenabled authentication device.

In the above-described illustrative embodiments, in the login process, the CPU 11 determines whether a particular user is permitted to login to the multifunction device 10 using authentication information acquired by one of the authentication devices 21 and 30, that is, whether the particular user is permitted to use all functions using the reading unit 19 and the image forming unit 20. Nevertheless, in other embodiments, for example, the CPU 11 may be configured to determine whether the particular user is permitted to use one or more particular functions using the reading unit 19 and the image forming unit 20 only.

FIG. 4 illustrates an example setting screen 60 when the external authentication device 30 is determined as a supplier. Therefore, the authentication-card type information 64 indicates that both the A-type IC card and the B-type IC card are available. Thus, the user information 65 includes one or more card IDs of eight-digit number or sixteen-digit number corresponding to the A-type IC card or the B-type IC card.

When the CPU 11 determines the internal authentication device 21 as a supplier, the authentication-card type information 64 indicates that only A-type IC card is available. In this case, in other embodiments, for example, only one or more card IDs of eight-digit number corresponding to the A-type IC card may be displayed as the user information 65 and one or more card IDs of sixteen-digit number corresponding to the B-type IC card might not be displayed as the user information 65 to indicate that the B-type IC card is not available, for example, the one or more card IDs of the B-type IC card may be grayed out.

What is claimed is:

1. An image processing apparatus comprising:
an internal receiving device configured to receive authentication information supplied by a user;
a communication unit configured to communicate with an external receiving device configured to receive authentication information supplied by a user independently from the internal receiving device;
an image processing unit; and
a controller configured to:
determine whether the external receiving device is connected to the image processing apparatus;
disable the internal receiving device in response to a determination that the external receiving device is connected to the image processing apparatus and perform an authentication process based on the authentication information received from the external receiving device without performing the authentication process based on the internal receiving device; and
perform an authentication process based on the authentication information received from the internal receiving device in response to a determination that the external receiving device is not connected to the image processing apparatus.

2. The image processing apparatus according to claim 1, wherein the controller is further configured to perform the authentication process based on the authentication information received from the external receiving device without performing the authentication process based on authentication information acquired from the internal receiving device in response to the determination that the external receiving device is connected to the image processing apparatus.

3. The image processing apparatus according to claim 1, wherein the controller is further configured to detect whether the external receiving device is connected to the communication unit.

4. The image processing apparatus according to claim 3, wherein the external receiving device is connected to the communication unit by a connection cable.

5. The image processing apparatus according to claim 3, wherein the controller is configured to determine the external receiving device is the first receiving device of the authentication information in response to a determination that the external receiving device is in communication with the communication unit.

6. The image processing apparatus according to claim 5, wherein the controller is further configured to determine the external receiving device is the receiving device of the authentication information in response to the determination that the external receiving device is in communication with the communication unit and a comparison result that available types of authentication information receivable by the external receiving device includes available types of authentication information receivable by the internal receiving device.

7. The image processing apparatus according to claim 3, wherein the controller is further configured to determine the image processing unit is prohibited to be used when the controller detects the external receiving device is not connected to the communication unit while the image processing unit is permitted to be used.

8. The image processing apparatus according to claim 1, wherein the image processing apparatus further comprises a light emitting unit, wherein the controller is further configured to turn on the light emitting unit in response to a determination that the external receiving device is not connected to the image processing apparatus.

9. A method of receiving authentication information in an image processing apparatus, the method comprising steps of:
  determining whether an external receiving device connected to a communication unit of the image processing apparatus, the external receiving device configured to receive authentication information supplied by a user independently from the internal receiving device;
  disabling an internal receiving device of the image processing apparatus in response to a determination that the external receiving device is connected the image processing apparatus and performing an authentication process based on the authentication information reeved from the external receiving device without performing the authentication process based on the internal receiving device; and
  performing an authentication process based on the authentication information received from the internal receiving device in response to a determination that the external receiving device is not connected to the image processing apparatus.

10. One or more non-transitory, computer-readable media storing computer-readable instructions therein that, when executed by at least one processor of an image processing apparatus, cause the image processing apparatus to:
  determine whether an external receiving device connected to a communication unit of the image processing apparatus, the external receiving device configured to receive authentication information supplied by a user independently from the internal receiving device;
  disable an internal receiving device of the image processing apparatus in response to a determination that the external receiving device is connected the image processing apparatus and performing an authentication process based on the authentication information reeved from the external receiving device without performing the authentication process based on the internal receiving device; and
  perform an authentication process based on the authentication information received from the internal receiving device in response to a determination that the external receiving device is not connected to the image processing apparatus.

* * * * *